(12) United States Patent
Mauro

(10) Patent No.: US 8,087,711 B1
(45) Date of Patent: Jan. 3, 2012

(54) GOLF CART WINDSHIELD ASSEMBLY

(76) Inventor: Edward Mauro, Clearwater, FL (US)

( * ) Notice: Subject to any disclaimer, the term of this patent is extended or adjusted under 35 U.S.C. 154(b) by 0 days.

(21) Appl. No.: 13/023,611

(22) Filed: Feb. 9, 2011

(51) Int. Cl.
*B60J 1/06* (2006.01)

(52) U.S. Cl. .................. 296/89; 296/96.21; 280/DIG. 5

(58) Field of Classification Search ................ 296/84.1, 296/96.21, 77.1, 78.1; 280/DIG. 5
See application file for complete search history.

(56) References Cited

U.S. PATENT DOCUMENTS

| | | | | |
|---|---|---|---|---|
| 5,192,109 A | * | 3/1993 | Roberts | 296/84.1 |
| 2009/0278373 A1 | * | 11/2009 | Rouzer et al. | 296/92 |

* cited by examiner

*Primary Examiner* — Joseph Pape

(74) *Attorney, Agent, or Firm* — Matthew G. McKinney

(57) ABSTRACT

A golf cart windshield assembly is disclosed. In a particular embodiment, the assembly includes a longitudinal U-shaped channel, where a first longitudinal slot is disposed adjacent to the U-shaped channel and the first slot is adapted to receive an edge of a lower windshield pane. A second longitudinal slot is disposed adjacent to the first slot, where the second slot is adapted to slidingly engage an edge of an upper windshield pane. A flange is joined along a longitudinal edge of the second slot and extends generally at a right angle to the second longitudinal slot and includes at least one aperture. The assembly also includes a spring loaded pin secured to the upper windshield pane, where the pin is adapted to engage the aperture of the flange to restrain the upper windshield pane in a desired vertical position.

19 Claims, 6 Drawing Sheets

GOLF CART WINDSHIELD ASSEMBLY

I. FIELD OF THE DISCLOSURE

The present disclosure is generally related to a golf cart windshield assembly.

II. BACKGROUND

Golf carts are motorized vehicles that are most often used by golfers when playing a round of golf. Although golf is generally played in favorable weather conditions, there are instances when additional protection from cold weather, wind or rain is needed to the occupants of the golf cart. The additional protection may be provided through the use of a windshield on the front of the golf cart. Prior art windshields for golf carts have included two panels where the top panel is adapted to open by folding down over the lower panel to provide an open area at the front of the golf cart. However, a shortcoming of the prior art golf cart windshields is the inability to easily and effectively secure the upper panel when in an open position and folded down over the lower panel.

Other prior art windshields are designed to be completely removed from the golf cart or are required to be stored on the roof portion of the golf cart. Thereby, making such prior art windshields inconvenient and cumbersome to maneuver. None of the prior art golf cart windshields have the ability to be adjusted to provide an opening of variable height.

It is, therefore, to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

III. SUMMARY

In a particular embodiment, a golf cart windshield assembly is disclosed. A golf cart windshield assembly is disclosed. In a particular embodiment, the assembly includes a longitudinal U-shaped channel, where a first longitudinal slot is disposed adjacent to the U-shaped channel and the first slot is adapted to receive an edge of a lower windshield pane. A second longitudinal slot is disposed adjacent to the first slot, where the second slot is adapted to slidingly engage an edge of an upper windshield pane. A flange is joined along a longitudinal edge of the second slot and extends generally at a right angle to the second longitudinal slot and includes at least one aperture. The assembly also includes a spring loaded pin secured to the upper windshield pane, where the pin is adapted to engage the aperture of the flange to restrain the upper windshield pane in a desired vertical position.

One particular advantage provided by embodiments of the golf cart windshield assembly is the ability to vertical adjust the opening in the windshield. This is particularly advantageous to open the windshield to provide additional breeze to the occupants of the golf cart and to easily and conveniently close the opening in cooler or less favorable weather conditions.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
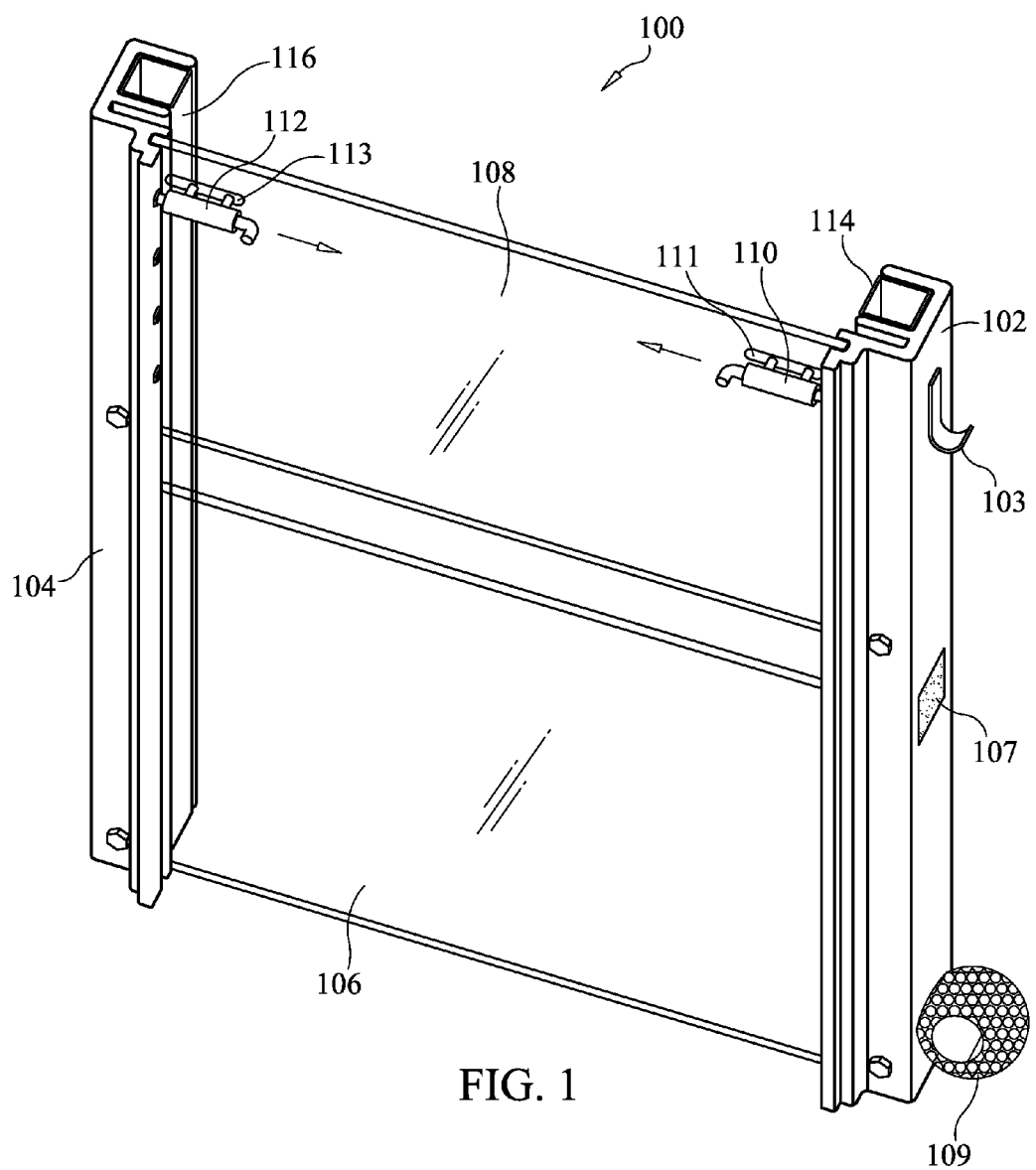
FIG. 1 is a perspective rear view of a particular embodiment of a golf cart windshield assembly.

Referring to FIG. 1, a particular illustrative embodiment of a golf cart windshield assembly is disclosed and generally designated 100. The windshield assembly 100 includes a first structural member 102 and a second structural member 104. A lower windshield pane 106 and an upper windshield pane 108 are secured between the structural members 102, 104. A first spring loaded pin 110 and a second spring loaded pin 112 are secured to the upper windshield pane 108. The respective free end of the pins 110, 112 may be pulled to remove the opposing end of the pin from the respective structural member. When the pin is released, the pin retracts back into the respective structural member. A hook 103 may be secured to an outer edge of the members 102, 104 by snapping a male portion of the hook 103 to a female portion on the members 102, 104. Another accessory that may be included on the members 102, 104 is a hook and loop strip 107 that may be used to attach golf gloves. Further, a cigar holder 109 may be snapped to the member 102 as illustrated in FIG. 1.

The first structural member 102 is secured to a first golf cart support post 114 and the second structural member 104 is secured to a second golf cart support post 116. A fastener means, such as bolts, for example, may be used to secure the windshield assembly 100 to the golf cart. The support posts 114, 116 may generally be square or any other shape, where the support member can also be configured to conform to any shape to fit over the support posts. Since each golf cart design is slightly different in the distance between the first post 114 and the second post 116, slots 111, 113 may be included within the windshield pane 108 so that the pins 110, 112 are adjustable to fit widths of many different golf cart designs. The slots 111, 113 allow the pins 110, 112 to slide horizontally within each respective slot 111, 113 and be secured to obtain the best fit possible. In addition, the windshield panes 106, 108 are easily replaceable if damaged because they require no glue in contrast to prior art windshield assemblies.

Figure 2:
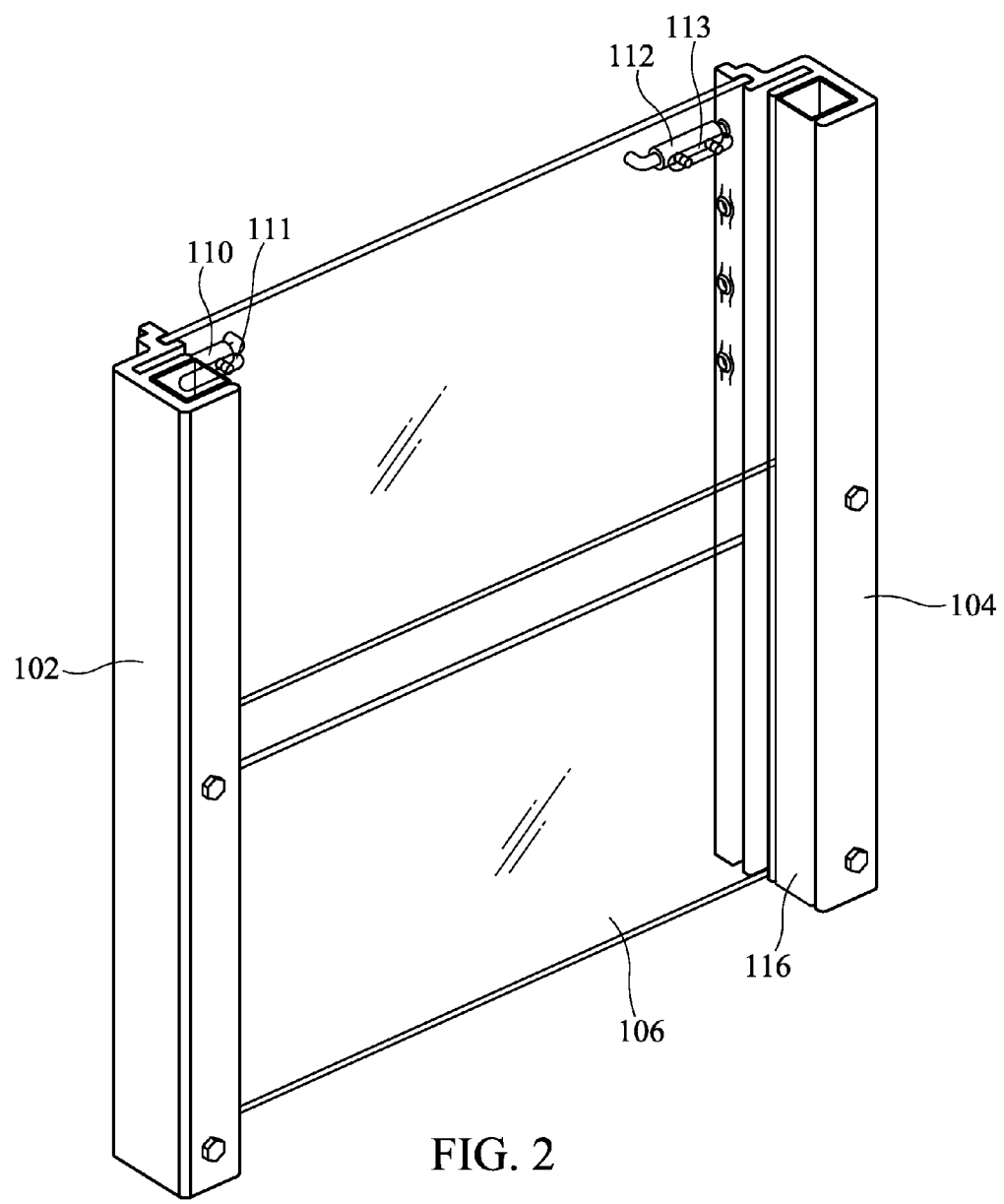
FIG. 2 is a perspective front view of a the golf cart windshield assembly of FIG. 1.
Figure 3:
FIG. 3 is a top view of the golf cart windshield system of FIGS. 1 and 2.

Referring now to FIG. 2, the front side of the windshield assembly 100 is illustrated. The support posts 102, 104 are disposed on opposing sides of a golf cart and adapted to support the upper windshield pane 108 and the lower windshield pane 106. The spring loaded pins 110, 112 are visible through the transparent upper windshield pane 108. A lower edge of the upper windshield pane 108 overlaps the lower windshield pane 106 when the upper windshield pane 108 is in the uppermost vertical position. This provides a complete barrier that protects the driver and passenger of the golf cart from the weather such as wind and rain, for example. Prior art describes two panes that are hinged together, which does not provide full protection from the elements through the gap between the panes in addition to not being vertically adjustable.

Figure 4:
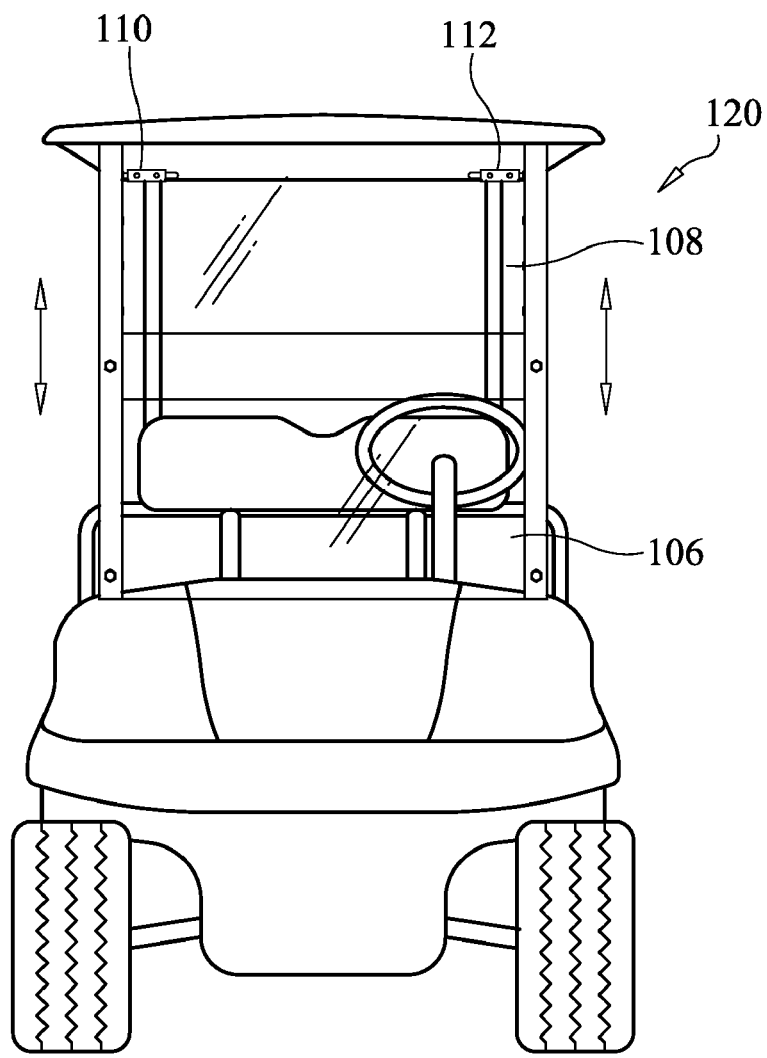
FIG. 4 is front view of the golf cart windshield assembly of FIGS. 1-3 installed on a golf cart.

As best illustrated in FIG. 4, the golf cart windshield assembly 100 is installed in the golf cart 120. The structural members 102, 104 are secured to the support posts 114, 116 of the golf cart 120. The overlap between the upper windshield pane 108 and lower windshield pane 106 is clearly visible. The upper windshield pane 108 is restrained in the desired vertical position using the spring loaded pins 110, 112, which engage apertures 150 disposed on a flange 148 of the windshield assembly 100. The spring loaded pins 110, 112 are reciprocally movable within a tubular housing between a first engaged position and a second retracted position. The apertures 150 may have a convex contour to all the pins 110, 112 to easily find and seat into the desired aperture 150. The user can allow the windshield pane 108 to slide down from one aperture 150 to the next and the convex shape will grab the respective pin 110, 112 and secure the windshield pane 108.

Figure 5:
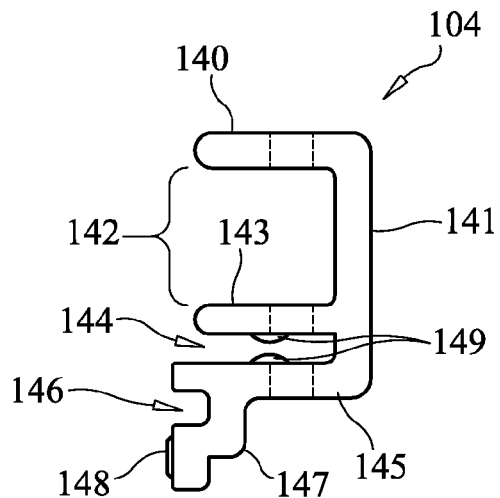
FIG. 5 is a cross sectional view of a structural member of a particular embodiment of the golf cart windshield assembly.

A cross sectional view of the structural member 102 is illustrated in FIG. 5. The first 102 and second structural 104 members are mirror images of one another. A longitudinal U-shaped channel 142 is formed between a first leg 140 and second leg 143 connected by a webbing 141, where the U-shaped channel 142 is adapted to fit over vertical support members 114, 116 of the golf cart 120. A first longitudinal slot 144 is disposed adjacent to the U-shaped channel 142, where the first slot 144 is adapted to slidingly engage an edge of the lower windshield pane 106 and is formed between the second leg 143 and a third leg 145. The pane 106 has clearance to slide up and down the slot 144, however, to eliminate vibration, small nipples 149 may be incorporated within the slot 144 to prevent the pane 106 from rattling in the slot 144 when the golf cart 120 is riding over bumpy terrain. A shoulder 147 forms a second longitudinal slot 146 disposed adjacent to the first slot 144, where the second slot 146 is adapted to receive an edge of the upper windshield pane 108. A flange 148 is joined along a longitudinal edge of the second slot 146 and extends generally at a right angle to the second longitudinal slot 146, where the flange 148 includes at least one aperture. The upper windshield pane 108 is adapted to slide within the second longitudinal slot 146 and along the length of the second longitudinal slot 146. The upper windshield pane 108 is adapted to overlap the lower windshield pane 106 by sliding within the second longitudinal slot 146, where the second longitudinal slot 146 is offset from the first longitudinal slot 144. The upper windshield pane 108 and the lower windshield pane 106 are adapted to fit between the vertical support members 114, 116 of the golf cart 120.

Figure 6:
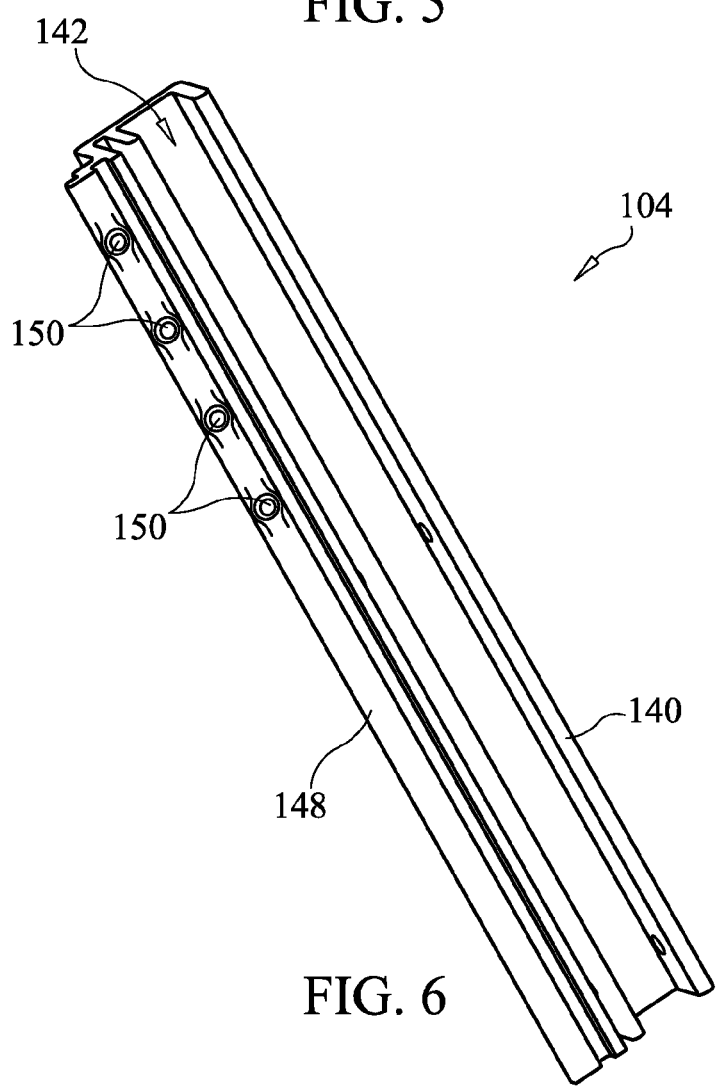
FIG. 6 is a front view of the structural member of FIG. 5.
Figure 7:
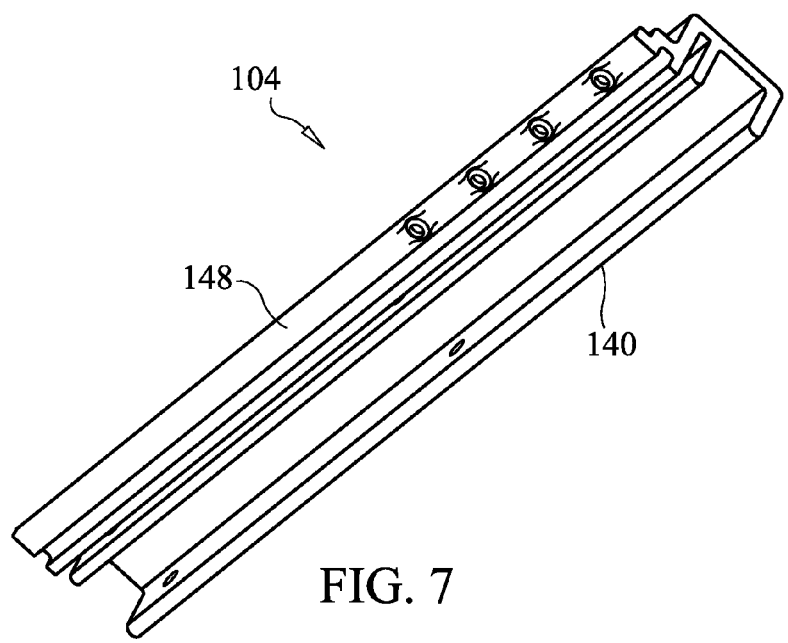
FIG. 7 is a perspective view of the structural member of FIGS. 5 and 6.
Figure 8:
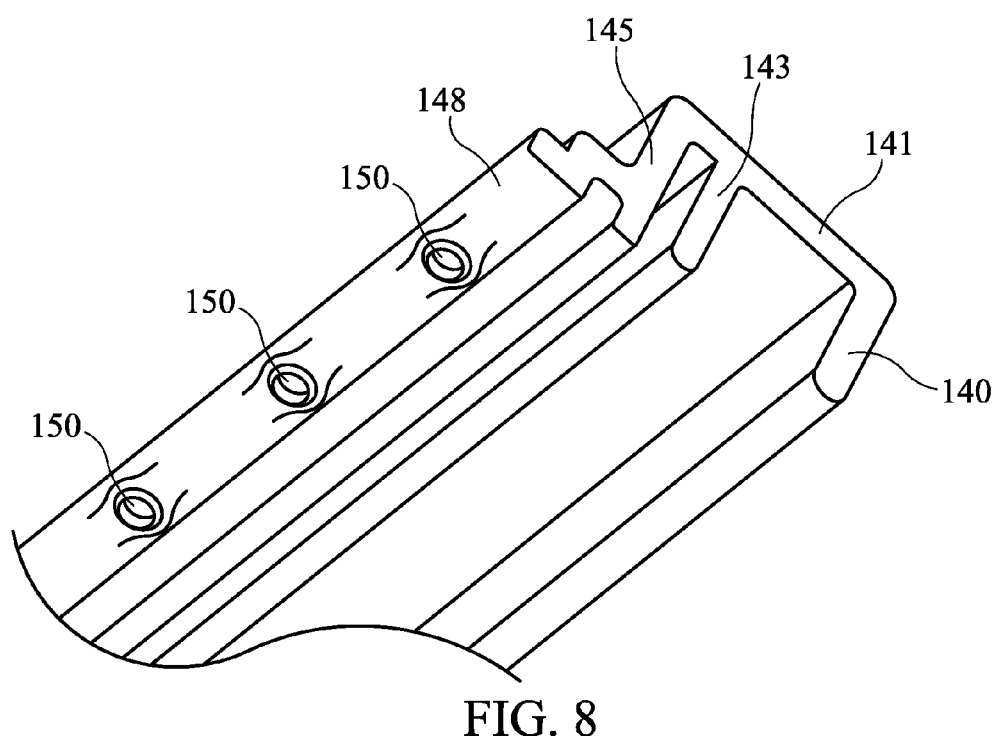
FIG. 8 is a partial view of the structural member of FIGS. 5-7.

Referring now to FIGS. 6-8 and as described above, the flange 148 may include the plurality of apertures 150 disposed along its length used to adjust the desired vertical position of the upper windshield pane 108. The vertical support members 114, 116 of the golf cart 120 may be rectangular tubing, for example so that the U-shaped channel 142 is adapted to receive the support members 114, 166. In an alternative embodiment, the support members 114, 116 are round posts, for example, and the U-shaped channel 142 is reciprocally round shaped to engage the round support members 114, 116. In addition, the apertures 150 along the flange 148 may be any number and any spacing desired to accommodate the vertically adjustable upper windshield pane 108.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.52(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A golf cart windshield assembly, the assembly comprising:
   a longitudinal U-shaped channel, wherein the U-shaped channel is adapted to fit over vertical support members of a golf cart;
   a first longitudinal slot disposed adjacent to the U-shaped channel, wherein the first slot is adapted to slidingly engage an edge of a lower windshield pane;
   a second longitudinal slot disposed adjacent to the first slot, wherein the second slot is adapted to receive an edge of a vertically adjustable upper windshield pane;
   a flange joined along a longitudinal edge of the second slot and extending generally at a right angle to the second longitudinal slot, wherein the flange further comprising at least one aperture.

2. The golf cart windshield assembly of claim 1, further comprising a spring loaded pin secured to the upper windshield pane, wherein the pin is adapted to engage the at least one aperture of the flange to restrain the upper windshield pane in a desired vertical position.

3. The golf cart windshield assembly of claim 2, wherein the upper windshield pane is adapted to slide within the second longitudinal slot and along the length of the second longitudinal slot.

4. The golf cart windshield assembly of claim 3, further comprising at least one bolt adapted to secure the U-shaped channel to the vertical support members of the golf cart.

5. The golf cart windshield assembly of claim 4, wherein the upper windshield pane is adapted to overlap the lower windshield pane by sliding within the second longitudinal slot, wherein the second longitudinal slot is offset from the first longitudinal slot.

6. The golf cart windshield assembly of claim 5, wherein the upper windshield pane and the lower windshield pane are adapted to fit between the vertical support members of the golf cart.

7. The golf cart windshield assembly of claim 6, wherein the vertical support members of the golf cart are rectangular tubing.

8. The golf cart windshield assembly of claim 7, wherein the spring loaded pin is reciprocally movable within a tubular housing between a first position and a second position.

9. The golf cart windshield assembly of claim 8, wherein the flange further comprising a plurality of apertures disposed along its length used to adjust the desired vertical position of the upper windshield pane.

10. A golf cart windshield assembly, the assembly comprising:
    a first longitudinal slot adapted to receive an edge of a lower windshield pane;
    a second longitudinal slot disposed adjacent to the first slot, wherein the second slot is adapted to receive an edge of an upper windshield pane and the upper windshield pane is adapted to slide within the second longitudinal slot along the length of the second longitudinal slot; and
    a flange joined along a longitudinal edge of the second slot and extending generally at a right angle to the second longitudinal slot, wherein the flange further comprising at least one aperture.

11. The golf cart windshield assembly of claim 10, further comprising a longitudinal U-shaped channel, wherein the U-shaped channel is adapted to fit over vertical support members of a golf cart to secure the assembly to the golf cart.

12. The golf cart windshield assembly of claim 11, further comprising a pin secured to the upper windshield pane and adapted to engage the at least one aperture of the flange to restrain the upper windshield pane in a desired vertical position.

13. The golf cart windshield assembly of claim 12, further comprising at least one bolt adapted to secure the U-shaped channel to the vertical support members of the golf cart.

14. The golf cart windshield assembly of claim 13, wherein the upper windshield pane is adapted to overlap the lower windshield pane when sliding within the second longitudinal slot and the second longitudinal slot is offset from the first longitudinal slot.

15. The golf cart windshield assembly of claim 14, wherein the golf cart windshield assembly is removable from the golf cart using a fastener.

16. The golf cart windshield assembly of claim 15, wherein the vertical support members of the golf cart are rectangular tubing.

17. The golf cart windshield assembly of claim 16, wherein the spring loaded pin is reciprocally movable within a tubular housing between a first position and a second position.

18. The golf cart windshield assembly of claim 10, wherein the flange further comprising a plurality of apertures disposed along its length used to adjust the desired vertical position of the upper windshield pane.

19. A golf cart windshield assembly, the assembly comprising:
    a pair of frame members, wherein each frame member of the pair of frame members comprising:
    a U-shaped channel;
    a first longitudinal slot disposed adjacent to the U-shaped channel, wherein the first slot is adapted to receive an edge of a lower windshield pane;
    a second longitudinal slot disposed adjacent to the first slot, wherein the second slot is adapted to receive an edge of an upper windshield pane; and
    a flange joined along a longitudinal edge of the second slot and extending generally at a right angle to the second longitudinal slot, wherein the flange further comprising at least one aperture.

* * * * *